United States Patent
Kato et al.

[11] Patent Number: 6,160,583
[45] Date of Patent: Dec. 12, 2000

[54] CAMERA HAVING A LOCKING TAB FOR LOCKING MOVEMENT OF A LENS BARREL WHEN EXTENDED TO A PHOTOGRAPHING POSITION

[76] Inventors: Koji Kato; Kunio Yokoyama; Yasuo Yamazaki; Tatsuji Higuchi; Shigeo Hayashi, all of c/o Intellectual Property & Legal Department Olympus Optical Co., Ltd., 2-3, Kuboyama-cho, Hachioji-shi, Tokyo, Japan

[21] Appl. No.: 08/636,337

[22] Filed: Apr. 23, 1996

[30] Foreign Application Priority Data

Apr. 26, 1995 [JP] Japan .................................... 7-102569

[51] Int. Cl.[7] .................................................... H04N 5/225
[52] U.S. Cl. ........................... 348/375; 396/146; 396/72; 348/335
[58] Field of Search ..................................... 348/335, 375, 348/72, 133; 396/144, 146, 72, 75, 76

[56] References Cited

U.S. PATENT DOCUMENTS

| | | | |
|---|---|---|---|
| 5,099,263 | 3/1992 | Matsumoto et al. | 354/195.12 |
| 5,293,192 | 3/1994 | Akitake et al. | 354/219 |
| 5,376,983 | 12/1994 | Yamazaki et al. | 354/195.12 |
| 5,587,754 | 12/1996 | Katayama et al. | 396/144 |
| 5,652,922 | 7/1997 | Kohno | 396/72 |
| 5,659,810 | 8/1997 | Normura et al. | 396/72 |
| 5,715,481 | 2/1998 | Ohmiya | 396/79 |
| 5,950,021 | 9/1999 | Suzuki et al. | 396/75 |

FOREIGN PATENT DOCUMENTS 61-188112  11/1986  Japan .

*Primary Examiner*—Wendy Garber
*Assistant Examiner*—Jacqueline Wilson
*Attorney, Agent, or Firm*—Volpe and Koenig, P.C.

[57] ABSTRACT

A rectilinear barrel of a camera supporting a lens group in a manner that the lens group is movable along a rectilinear slot in the direction of its optical axis, a cam ring which has on its circumference a rib with a cutout portion and which rotates to drive the lens group in the direction of the optical axis, a threaded driving shaft for moving the rectilinear barrel between an imaging position and a retracted position, a zoom gear for rotating the cam ring when the rectilinear barrel is at the imaging position, and a locking tab for allowing the rectilinear barrel to move by means of the threaded driving shaft by aligning itself with the cutout portion and for locking the movement of the cam ring, and thus, the rectilinear barrel by aligning itself with the rib.

24 Claims, 8 Drawing Sheets

CAMERA HAVING A LOCKING TAB FOR LOCKING MOVEMENT OF A LENS BARREL WHEN EXTENDED TO A PHOTOGRAPHING POSITION

BACKGROUND OF THE INVENTION

1. Field of the Invention

The present invention relates to a camera and, more particularly to a camera that has a lens barrel movable between its imaging position and its retracted position that is closer to the body of the camera than the imaging position.

2. Related Art Statement

More and more compact design today is required of cameras, and furthermore users do not like any projections from the body of a camera that are likely to impair portability when carrying it.

To make an imaging lens measure up to its intended performance, a certain range of travel along the optical axis of the lens is required, and thus compact design is difficult to achieve. Since a high magnification zooming is preferred recently, a lens barrel that houses an imaging lens is obliged to be further extended in the direction of the optical axis.

To meet this apparently contradictory demand for a compact camera with an enlarged imaging lens, there are proposed cameras which have a movable lens barrel that is shifted to its imaging position projected out of the camera body during photographing and shifted back to its retracted position that is closer to the body of the camera than the imaging position during non-photographing duration such as when the camera is simply being carried. A diversity of cameras of this sort has been proposed.

As an example, Japanese Laid-open Utility Model Application No. Shou-61-188112 discloses the camera, in which zooming action is continuously performed in the extension of the full zoom travel from the telephoto side to wideangle side until a lens barrel is retracted into the camera body.

In the above cited Japanese Laid-open Utility Model Application No. Shou-61-188112, however, if the lens barrel ready for photographing is pressed backward from the front side in the optical axis, for example, by a hand, the carring in the lens barrel rotates, activating the zooming action to retract the lens barrel and thereby disabling photographing.

OBJECTS AND SUMMARY OF THE INVENTION

It is a first object of the present invention to provide a camera which is provided with a lens barrel that is prevented from moving in the direction of the optical axis in its imaging position even when an external force is applied.

It is a second object of the present invention to provide a camera that is provided with a lens barrel which is prevented from moving in the direction of the optical axis in its imaging position when an external force is applied and which does not interfere with a focal length adjustment, motion.

The camera of the present invention comprises a lens barrel movable between an imaging position and a retracted position that is closer to the body of the camera than the imaging position and barrel position restraint means which permits the movement of the lens barrel when the lens barrel moves to the imaging position or to the retracted position, and which restrains the movement of the lens barrel in the direction of the optical axis when the lens barrel has reached the imaging position.

These as well as other objects and advantages of the present invention will become further apparent from the following detailed explanation.

DETAILED DESCRIPTION OF THE PREFERRED EMBODIMENTS

Figure 1:
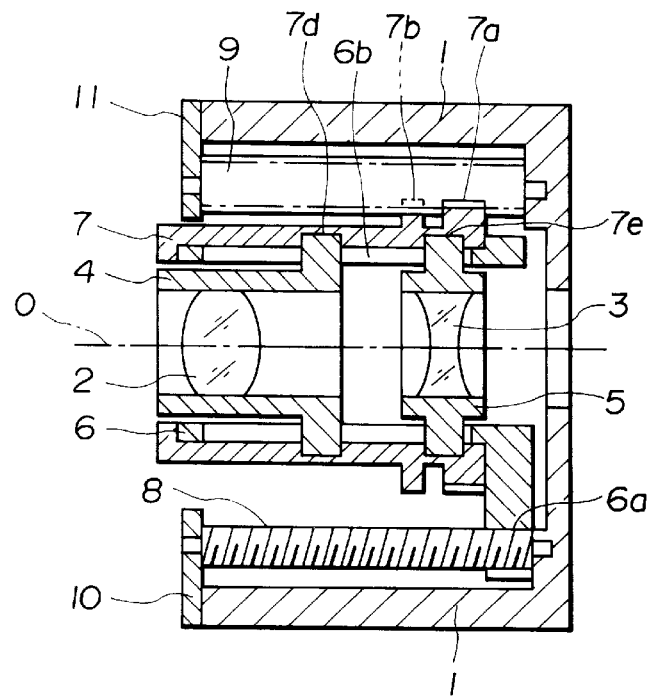
FIG. 1 is a cross-sectional view of a camera taken along the optical axis and showing a lens barrel when retracted, according to a first embodiment of the present invention.

Referring now to the drawings, the embodiments of the present invention will now be discussed in detail.

Figure 2:
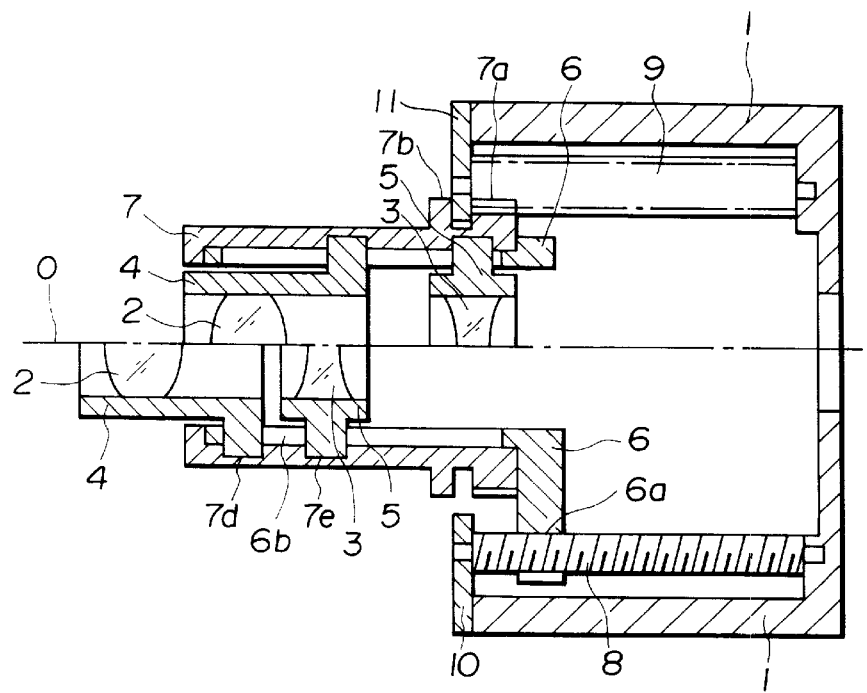
FIG. 2 is a cross-sectional view of the camera showing the lens barrel ready for use taken along the optical axis according the first embodiment wherein the upper half shows the lens barrel in its wideangle setting and the lower half shows the lens barrel in its telephoto setting.

FIGS. 1 through 5 show the first embodiment of the present invention. FIG. 1 is the cross-sectional view of a camera taken along the optical axis and showing the lens barrel in its retracted position. FIG. 2 is the cross-sectional view of the lens barrel ready for use taken along the optical axis, wherein the upper half shows the lens barrel in its wideangle setting and the lower half shows the lens barrel in its telephoto setting.

The optical system in this embodiment comprises a first lens group 2 having a positive refracting power and a second lens group 3 having a negative refracting power, and constitutes a two-group zoom lens.

The first lens group 2 and second lens group 3 are held by a first-group barrel 4 and a second-group barrel 5, respectively.

The first-group and second-group barrels 4, 5 have pins which are projected from their circumferences and are inserted through rectilinear slots 6b formed in a movable barrel 6 as a first barrel. The barrels 4, 5 are supported such that they are axially movable along the optical axis O relative to the movable barrel 6.

The movable barrel 6 has on its outer circumference a cam ring 7 as a second barrel that is rotatebly supported by a camera body 1, and the cam ring 7 has on its inner circumference a cam groove 7d with which the pins projected from the circumference of the first-group barrel 4 are engaged, and a cam groove 7e with which the pins projected from the circumference of the second-group barrel 5 are engaged.

By rotating the cam ring 7, zooming is performed between a wideangle side and a telephoto side as shown in FIG. 2.

As shown in FIG. 1, the lens barrel is designed to be shifted to its retracted position, that is further retracted than its wideangle position, and offers a compact size with the overall length of the camera body shortened.

Specifically, a locking tab 11 as barrel locking means as well as barrel position restraint means is attached onto the front portion of the camera body 1, and a zoom gear 9 as second driving means is rotatably supported between the locking tab 11 and the camera body 1.

The zoom gear 9 is in mesh with a gear 7a formed onto the circumference of the rear end of the cam ring 7 in order to rotate the cam ring 7. Disposed in the vicinity of and in front of the gear 7a of the cam ring 7 is an annular rib 7b to be engaged with the locking tab 11.

A pressure plate 10 is attached onto the front end of the camera body 1, and a threaded driving shaft 8 as first driving means is rotatably supported between the pressure plate 10 and the camera body 1.

The threaded driving shaft 8 is in mesh with a female threaded portion 6a formed at the rear end of portion of the movable barrel 6 in order to move the movable barrel 6 back and forth along the optical axis O.

In the above arrangement, when the driving threaded shaft 8 rotates, the movable barrel 6 moves back and forth in the direction of the optical axis O between the retracted position that is a recessed position inside the camera body 1 and a predetermined position that is projected out of the retracted position.

When the zoom gear 9 is rotated with the movable barrel 6 at the predetermined position, the cam ring 7 rotates, putting the camera into the wideangle state, one of the ready-for-use states. If the zoom gear 9 is further rotated, zooming is performed putting the camera into the telephoto state.

Next, the locking mechanism of the lens barrel of the embodiment is now discussed referring to FIGS. 1 through 5.

Figure 3:
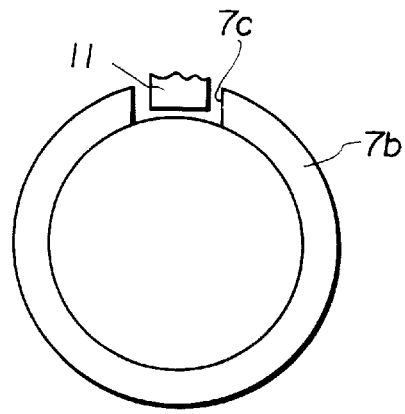
FIG. 3 is a front view showing the positional relationship between the rib of a cam ring and a locking tab when the cam ring is turned to its retracted position in the embodiment 1.
Figure 4:
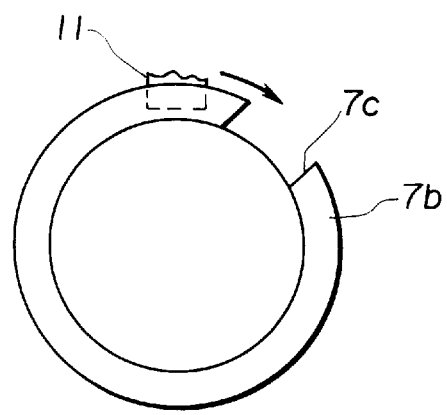
FIG. 4 is a front view showing the positional relationship between the rib of the cam ring and the locking tab when the cam ring is turned to its wideangle position in the first embodiment.
Figure 5:
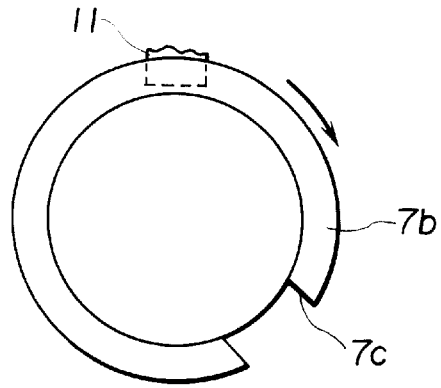
FIG. 5 is a front view showing the positional relationship between the rib of the cam ring and the locking tab when the cam ring is turned to its telephoto position in the first embodiment.

FIGS. 3 through 5 show the positional relationship of the locking tab 11 and the rib 7b of the cam ring 7. FIG. 3 shows the cam ring 7 in its retracted position, FIG. 4 shows the cam ring 7 in its wideangle position, and FIG. 5 shows the cam ring 7 in its telephoto position.

Discussed next is the projection operation of the lens barrel from the retracted state to the ready-for-use state.

When the driving threaded shaft 8 is rotated with the lens in the retracted state in FIG. 1, the movable barrel 6 causes the lens barrel to move along the optical axis O and reach a predetermined position.

An almost square cutout portion 7c is formed in the rib 7b of the cam ring 7 as shown in FIG. 3. By allowing the locking tab 11 to pass through the cutout portion 7c, the rib 7b of the cam ring 7 reaches the predetermined position in front of the locking tab 11. The predetermined position of the cam ring 7 corresponds to the retracted position in terms of angle of rotation and corresponds to the imaging position in terms of axial movement along the optical axis.

Once the cam ring 7 is in the predetermined position, rotating the zoom gear 9 causes the cam ring 7 in the retracted position to turn to the wideangle position in terms of angle of rotation as shown in FIG. 4. The lens barrel is set to the wideangle state shown in the upper half of FIG. 2.

In the wideangle state, the locking tab 11 is held between the rib 7b and the gear 7a as shown in FIGS. 2 and 4, and even if an external force is exerted, the cam ring 7 keeps its axial position along the optical axis.

The zoom gear 9 is further rotated from the wideangle state, and the first-group barrel 4 and second-group barrel 5 are shifted along the cam grooves 7d, 7e of the cam ring 7 in the direction of the optical axis toward the telephoto state shown in FIG. 5.

Even when the cam ring 7 is in the telephoto state, the locking tab 11 remains held between the rib 7b and the gear 7a, and the axial position of the cam ring 7 along the optical axis remains unchanged.

To retract back from the ready-for-use state, the above operation is reversed. First, the cam ring 7 is rotated in the reverse direction, namely from the telephoto side to the wideangle side, and further rotated to the predetermined position shown in FIG. 3. Next, the driving threaded shaft 8 is rotated in the reverse direction to retract the lens barrel into the retracted position inside the camera body 1.

In this embodiment, only a single cutout portion 7c to pass the locking tab 11 therethrough is formed in the rib 7b of the cam ring 7. Alternatively, a plurality of cutout portions may be employed.

In this embodiment, the locking tab 11 is held by allowing it to be sandwiched between the rib 7b of the cam ring 7 and the gear 7a. Alternatively, another rib may be formed between the rib 7b and the gear 7a to sandwich the locking tab 11 between these two ribs.

Since the lens barrel, while in the ready-for-use state, maintains its axial position along the optical axis according to the first embodiment, the lens barrel is prevented from shifting to its retracted position where photographing is impossible, if an external force is applied. An undesired action is thus avoided.

Figure 6:
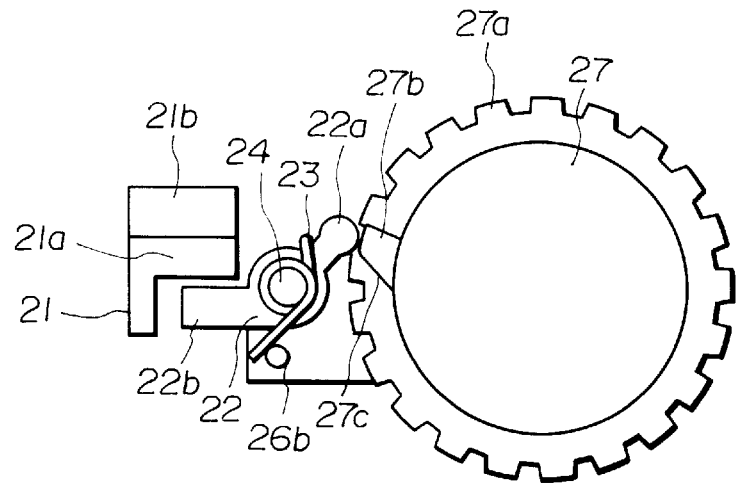
FIG. 6 is a front view showing the lens barrel in its retracted position according to a second embodiment of the present invention.
Figure 7:
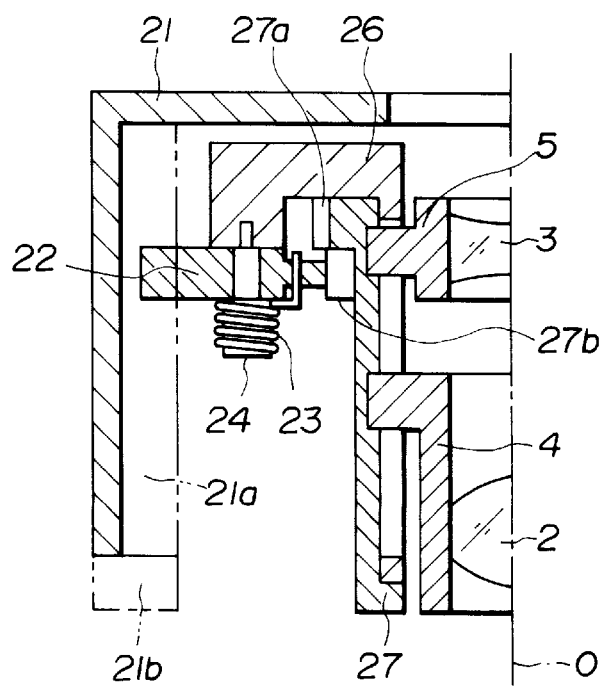
FIG. 7 is a cross-sectional view taken along the optical axis and showing a half of the lens barrel in its retracted position in the second embodiment.
Figure 8:
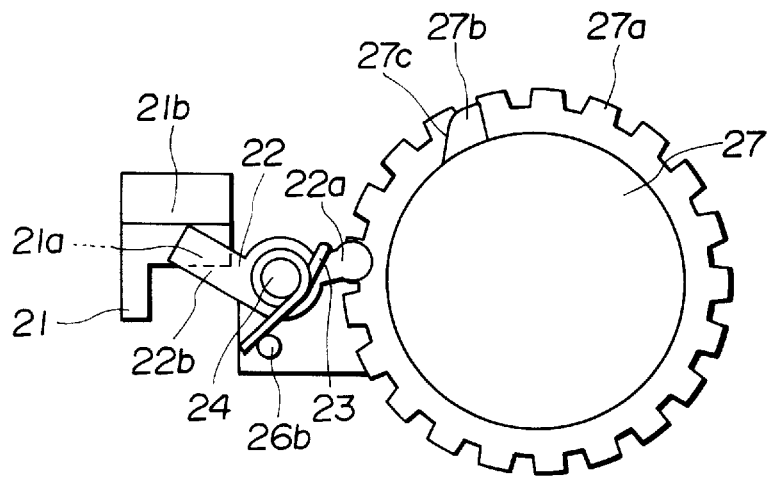
FIG. 8 is a front view showing the lens barrel in its wideangle setting in the second embodiment.
Figure 9:
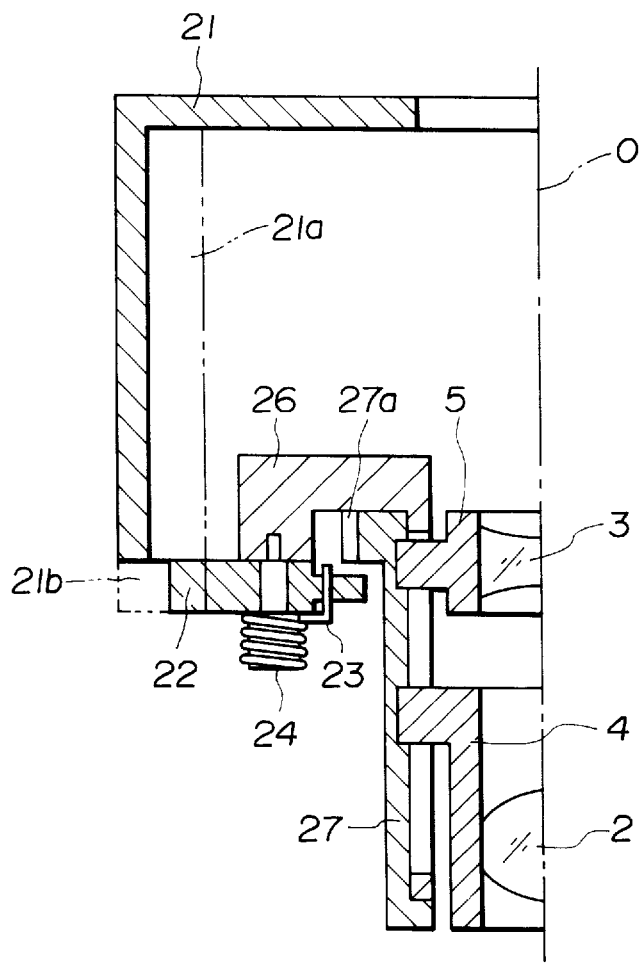
FIG. 9 is a cross-sectional view taken along the optical axis and showing a half of the lens barrel in its wideangle setting in the second embodiment.

FIGS. 6 through 12 show the second embodiment of the present invention. FIG. 6 is the front view showing a lens barrel in its retracted position, FIG. 7 is a cross-sectional view taken along the optical axis and showing a half of the lens barrel in its retracted position, FIG. 8 is a front view showing the lens barrel in its wideangle setting, and FIG. 9 is a cross-sectional view taken along the optical axis and showing a half of the lens barrel in its wideangle setting.

In the explanation of the second embodiment, components equivalent to those with reference to the first embodiment are designated with the same reference numerals, and their explanation is not repeated. The following discussion focuses on the differences from the first embodiment.

The lens barrel of the camera of this embodiment is provided with the mechanisms for zooming the lens barrel and for moving the barrel between its retracted position and wideangle position, such as the zoom gear 9 and the driving threaded shaft 8, in the same manner as in the embodiment 1, though they are not shown.

The locking mechanism of the second embodiment is discussed below.

Although a camera body 21, a movable barrel 26 as first barrel, and a cam ring 27 as second barrel are constructed respectively in a manner similar to the first camera body 1, the movable barrel 6 and the cam ring 7 in the first embodiment are constructed, the locking mechanism of the second embodiment is different from that of the first embodiment.

The cam ring 27 is provided with a gear 27a around its circumference and a projection 27b projected from its circumference. The projection 27b drives a locking plate 22 as barrel position restraint means as well as barrel locking means. The projection 27b has an approximately trapezoidal form when viewed from the front, and has on one side a sloped wall 27c whose inclination is milder than the inclination of the wall on the opposite side 27d.

The movable barrel 26 is terminated on its rear end in a U-shape in cross-section, namely, it has a flange portion that projects radially outwardly from its rear end and then a ring portion that extends forwardly continuously from the outer edge of the flange portion as shown in FIG. 7. A locking plate 22 is rotatably supported to the end of the U-shape by a shaft 24 that is secured so that it is secured in parallel with the optical axis O.

The locking plate 22 is provided with a driving arm 22a that is terminated in a round engagement portion and an approximately rectangular-shaped locking arm 22b that extends from the center of the locking plate 22 in a direction slightly off diagonally opposite to that of the driving arm 22a.

The shaft 24 is biased by a locking spring 23 such as a coil spring. One end of the locking spring 23 is engaged with the driving arm 22a of the locking plate 22 and the other end is connected to a spring hook 26b comprised of a pin standing on the movable barrel 26. The locking plate 22 is therefore urged in clockwise direction in the FIG. 6.

An engagement portion 21a that is a rib elongated in the direction of the optical axis extends radially inwardly at the position of the camera body 21 with which the locking arm 22b of the locking plate 22 comes into contact, and disposed at the end of the engagement portion 21a is an approximately square stopper portion 21b.

The operation of the locking mechanism of the embodiment 2 is now discussed.

When the cam ring 27 is in its retracted position in terms of angle of rotation as shown in FIG. 6, the locking plate 22 is urged by a locking spring 23 so that the driving arm 22a rests on the projection 27b of the cam ring 27.

The locking arm 22b of the locking plate 22 in this condition is not in contact with the engagement portion 21a of the camera body 21. Thus, rotating an unshown driving threaded shaft to shift the movable barrel 26 out of the retracted position to the predetermined position is permitted without any restraint motion.

When the lens barrel is thus projected to its predetermined position, the locking arm 22b of the locking plate 22 clears the engagement portion 21a of the camera, body 21 and is positioned so that it can be contact with the stopper portion 21b.

In the predetermined position, by rotating an unshown zoom gear, the cam ring 27 rotates clockwise around the optical axis. FIGS. 8 and 9 show that the cam ring 27 is now in its ready-for-use state after being rotated to its wideangle setting.

When the cam ring 27 rotates to its wideangle position, the projection 27b of the cam ring passes its engagement position with the arm 22a of the locking plate 22. The locking plate 22 is rotated clockwise by the urging of the locking spring 23 until the locking arm 22b abuts and rests on the underside of stopper portion 21b of the camera body 21 the end of stopper portion 21b is shown in dotted fashion in FIG. 9 for purposes of simplicity.

In this condition, the locking arm 22b of the locking plate 22 is positioned to be longitudinally in contact with the forward end of engagement portion 21a of the camera body 21 along the optical axis. Even if any external force is applied to the lens barrel from the front, the locking plate 22 abuts the engagement portion 21a of the camera body 21, restraining the axial movement of the lens barrel. Therefore, the lens barrel is prevented from being pushed to the retracted position into the camera body.

This position restraining action is kept to be effective even when the camera is put into the telephoto state with the cam ring 27 further rotated.

Discussed next is the retraction action of the lens barrel into the camera body 21.

By carrying out the above operation of the cam ring 27 in reverse, the cam ring 27 is rotated from the wideangle position to the predetermined position.

The locking plate 22 is rotated counterclockwise so that the driving arm 22a slides up along the sloped wall 27c of the cam ring 27 and rides on the projection 27b. This action disengages the locking arm 22 out of the forward end of engagement portion 21a and stopper portion 21b, and thus disengages the camera body 21 from the locking plate 22.

In this condition, by allowing the unshown driving threaded shaft to rotate in reverse to the direction of the projection operation, the lens barrel is retracted into the camera body 21.

Figure 10:
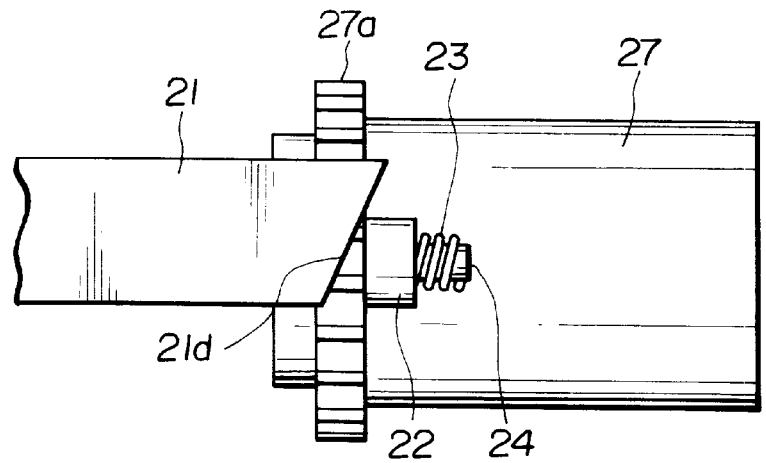
FIG. 10 is a plan view showing a first alternate example of the receptacle section of the camera body in the second embodiment.

In this embodiment, the stopper portion 21b is provided to stop the rotation of the locking plate 22 when the lens barrel is projected out. Alternatively, the engagement portion 21a of the camera body 21 may be constituted by a sloped wall 21d without employing the stopper portion 21b as shown in FIG. 10. This arrangement allows the locking plate 22 to be positioned relative to the camera body 21 without looseness.

This embodiment presents the mechanism to cope with the external force in the direction of retraction only. If a U-shaped groove engagement portion 21e is formed on the camera body 21, for example, as shown in FIG. 11, the lens barrel is restrained against movement in both the retraction and projection directions.

Figure 12:
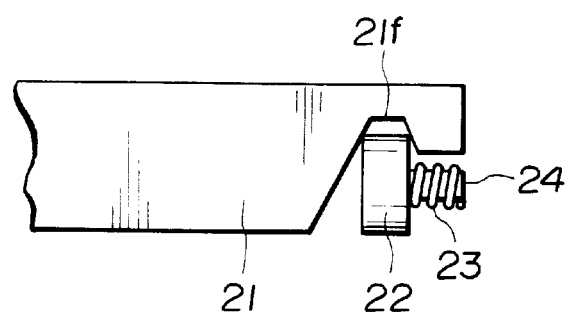
FIG. 12 is a plan view showing a third alternate example of the receptacle section of the camera body in the second embodiment.

Furthermore, an engagement portion 21f having sloped walls on both sides may be formed as shown in FIG. 12. This arrangement allows positioning in the retraction and projection directions without looseness.

Figure 11:
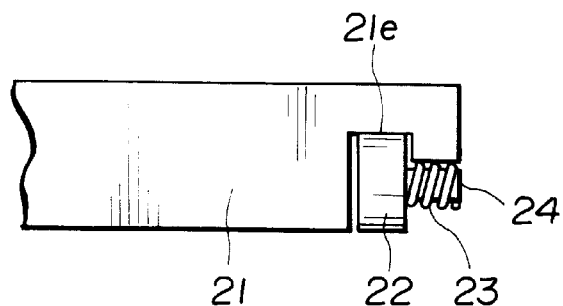
FIG. 11 is a plan view showing a second alternate example of the receptacle section of the camera body in the second embodiment.

The same advantage may be enjoyed if the locking plate 22 to be engaged with the engagement portion 21e is provided with sloped walls on both sides of the locking plate 22 with the engagement portion 21e remaining unchanged from the vertical side wall configuration shown in FIG. 11. Alternatively, each of the engagement portion 21e and the locking plate 22 may be provided with sloped walls on both sides. This arrangement increases the contact areas, allowing the mechanism to withstand a larger external force.

Furthermore, it is perfectly acceptable that a groove engagement portion is formed on the locking plate 22 side and a rib projection is formed on the camera body 21 side.

To increase locking power, a plurality of any of the above described mechanisms may be formed on the movable barrel 26.

The second embodiment of the present invention offers almost the identical advantage as the first embodiment. In the first embodiment, however, the locking tab is held between the rib and the gear, friction with the cam ring takes place when an external force is applied, and the load in zooming operation is likely to increase. Since, in the second embodiment, the external force is received by the camera body and the movable barrel, no load increase in zooming takes place.

Figure 13:
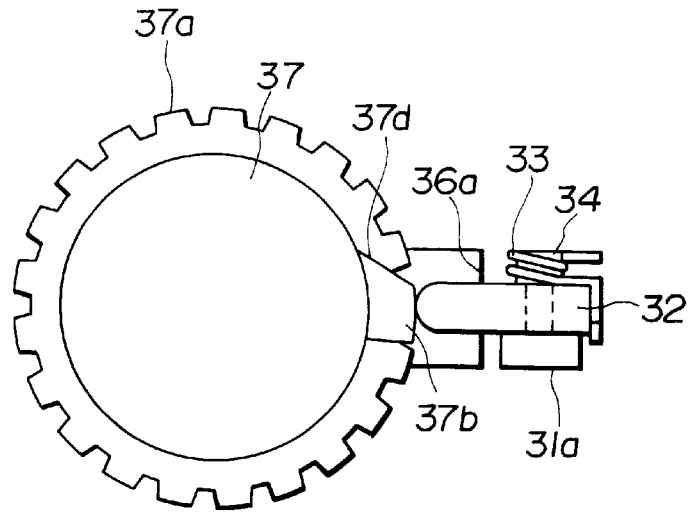
FIG. 13 is a front view of the lens barrel in its retracted position according to a third embodiment of the present invention.
Figure 14:
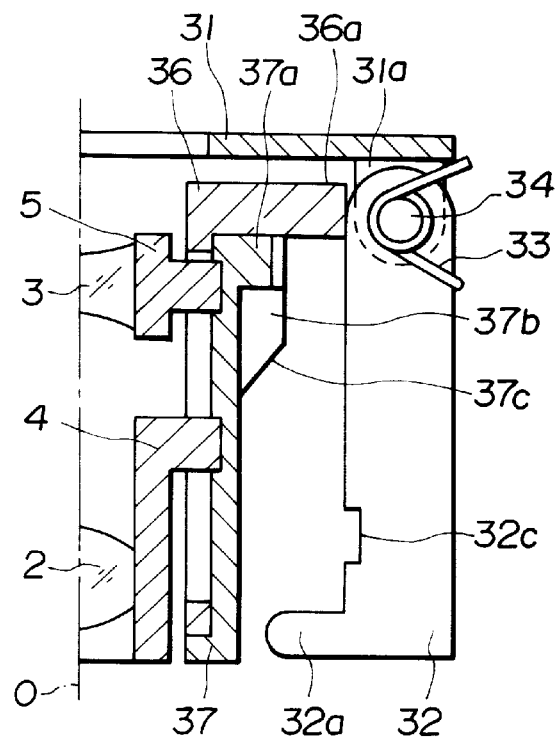
FIG. 14 is a cross-sectional view showing a half of the lens barrel in its retracted position in the third embodiment of the present invention.
Figure 15:
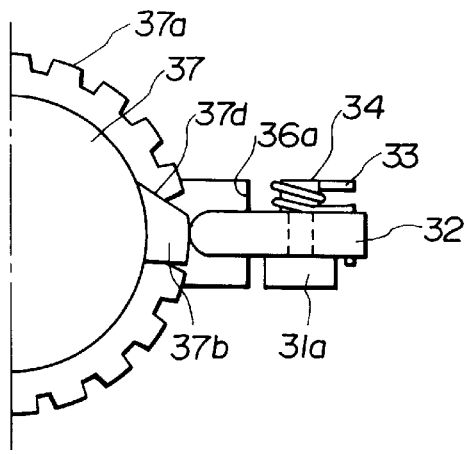
FIG. 15 is a front view showing a half of the lens barrel in the third embodiment of the present invention, wherein the lens barrel is projected out to a predetermined position and the cam ring is in its retracted position.
Figure 16:
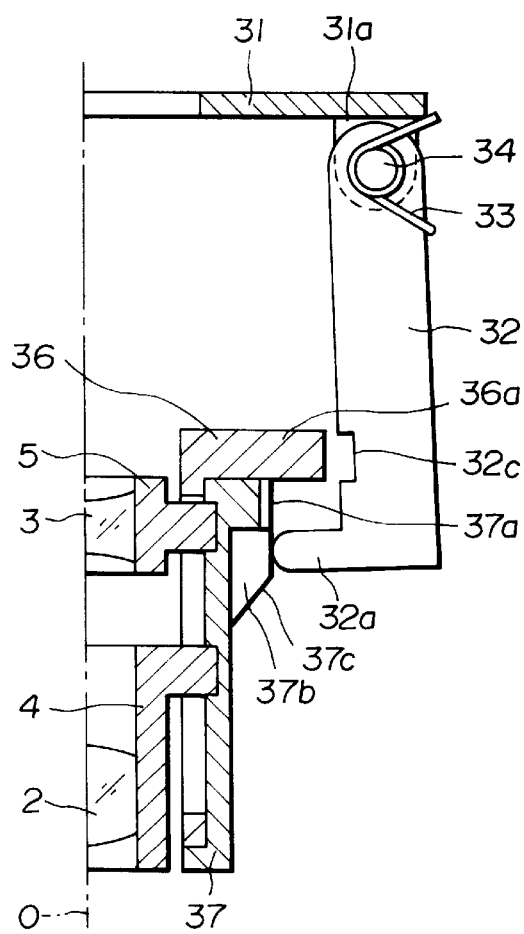
FIG. 16 is a cross-sectional view showing a half of the lens barrel in the third embodiment of the present invention, wherein the lens barrel is projected out to the predetermined position and the cam ring is in its retracted position.
Figure 17:
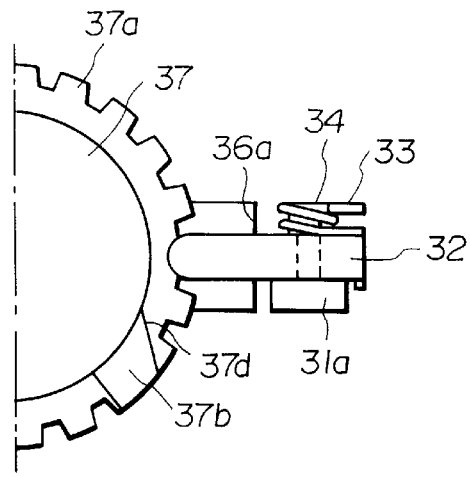
FIG. 17 is a front view showing a half of the lens barrel in the third embodiment of the present invention, wherein the lens barrel is projected out to the predetermined position and the cam ring is in its wideangle position.
Figure 18:
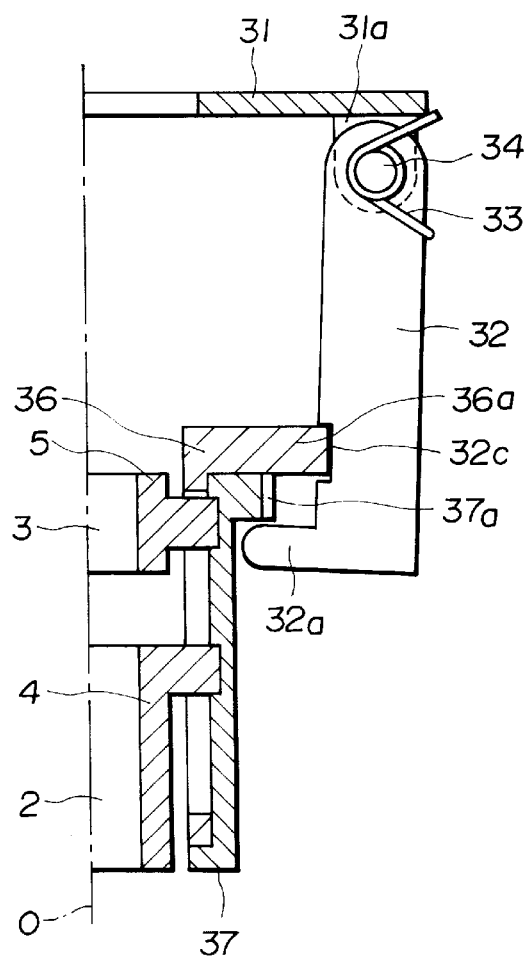
FIG. 18 is a cross-sectional view showing a half of the lens barrel in the third embodiment of the present invention, wherein the lens barrel is projected out to the predetermined position and the cam ring is in its wideangle position.

FIGS. 13 through 18 show the third embodiment of the present invention. FIG. 13 is the front view of the lens barrel in its retracted position, FIG. 14 is the cross-sectional view showing a half of the lens barrel in its retracted position, FIG. 15 is the front view showing a half of the lens barrel, wherein the lens barrel is projected out to the predetermined position and the cam ring is in its retracted position, FIG. 16 is the cross-sectional view showing a half of the lens barrel, wherein the lens barrel is projected out to the predetermined position and the cam ring is in its retracted position, FIG. 17 is the front view showing a half of the lens barrel, wherein the lens barrel is projected out to the predetermined position and the cam ring is in its wideangle position, and FIG. 18 is the cross-sectional view showing a half of the lens barrel, wherein the lens barrel is projected out to the predetermined position and the cam ring is in its wideangle position.

In the third embodiment, components equivalent to those with reference to above-described first and second embodiments are designated with the same reference numerals, and the following discussion focuses on only the differences from the first and second embodiments.

The lens barrel of the camera of this embodiment is provided with the mechanisms for zooming the lens barrel and for moving the lens barrel between its retracted position and wideangle position, such as the zoom gear 9 and the driving threaded shaft 8, in the same manner as in the first embodiment, though they are not shown.

The locking mechanism of the third embodiment is now discussed.

Although a camera body 31, a movable barrel 36 as first barrel, and a cam ring 37 as second barrel are constructed respectively in a manner similar to the camera body 1, the movable barrel 6 and the cam ring 7 in the first embodiment are constructed, the locking mechanism of the third embodiment is different from that of the first embodiment.

In the third embodiment, the locking plate 22, mounted in the movable barrel 26 of the lens barrel in the second embodiment, is mounted on the camera body side.

A shaft 34 stands at right angles to the optical axis O on a mounting bracket 31a of a camera body 31, and a locking lever 32 that is a barrel position restraint means as well as a barrel locking means, is pivotally supported by the shaft 34.

The locking lever 32 has a projection 32a that extends from the end of the locking lever 32 radially inwardly, and also has on one side a square groove 32c slightly inward from the end having projection 32a and in a direction along the optical axis (upward in FIG. 14).

The shaft 34 is loaded with a locking spring 33 such as a coil spring. One end of the locking spring 33 is engaged with the locking lever 32 and the other end is connected to the camera body 31 so that the locking lever 32 is urged clockwise in FIG. 14 about pin 34.

A projection 36a extends radially outwardly from the rear end of the movable barrel 36 to restrain the pivotal motion of the locking lever 32.

The cam ring 37 is provided with a gear 37a on its outer circumference, and a projection 37b standing on its circumference to restrain the pivotal motion of the locking lever 32. The projection 37b has an approximately trapezoidal form when viewed from the front, and has a mildly sloped wall 37d on one side as shown in FIG. 13 and also a mildly sloped wall 37c extending forwardly along the optical axis as shown in FIG. 14.

The operation of the locking mechanism of the third embodiment is now discussed.

When the lens barrel is retracted in the camera body 31 as shown in FIGS. 13 and 14, the clockwise pivotal motion of the locking lever 32 about its shaft 34 is restrained by the projection 36a of the movable barrel 36 in FIG. 14. The driving projection 32a on the end of the locking lever 32 is clear of the cam ring 37.

In the course of projection of the lens barrel, the cam ring 37 does not touch the projection 32a, and any damage, such as a scratch, is unlikely.

When the unshown driving threaded shaft is rotated to project the lens barrel along the optical axis, the projection 32a of the locking lever 32 abuts the sloped wall 37c of the projection 37b projected out of the circumference of the cam ring 37.

When the lens barrel is projected to the predetermined position, the projection 32a of the locking lever 32 slides up along the sloped wall 37c and rides on the projection 37b as shown in FIGS. 15 and 16.

In this condition, the projection 37b of the cam ring 37 restrains the locking lever 32 in its clockwise pivotal motion around the shaft 34 in FIG. 14.

Next, the unshown zoom gear is rotated, causing the cam ring 37 to rotate from the retracted position to the wideangle position. The projection 37b is rotated clockwise in FIG. 15, and clears the projection 32a of the locking lever 32.

In this condition, the locking lever 32 is pivoted clockwise about pin 34 by the spring 33 in FIG. 18, and the groove 32c of the locking lever 32 engages with the projection 36a of the movable barrel 36, restraining the axial movement of the movable barrel 36 as shown in FIGS. 17 and 18.

In this case, some clearance is allowed between the projection 32a and the gear 37a, and the projection 32a and the cam ring 37, and no contact therebetween takes place. Thus, the rotation of the cam ring 37 in zooming is not interfered with.

Discussed next is the retraction operation of the lens barrel into the camera body 31.

To retract the lens barrel, the unshown zoom gear is rotated in reverse to the above-described direction, rotating the cam ring 37 to the retracted position. As the locking lever 32 rides on the projection 37b after sliding up along the sloped wall 37d, the locking lever 32 is pivoted counterclockwise in FIG. 18, and reaches the predetermined position as shown in FIG. 16.

In this condition, by rotating the unshown driving threaded shaft in reverse to the direction of projection, the lens barrel is retracted into the camera body 31 as shown in FIG. 14.

The groove 32c of the locking lever 32 and/or the projection 37b of the movable barrel 37 may be constructed such that they have sloped walls, so that a locking mechanism is free from looseness.

A plurality of mechanisms according to this embodiment may be employed. The mechanisms of the first through third embodiments may be combined.

The third embodiment not only offers the same advantage as the first embodiment, but provides an excellent locking mechanism wherein zooming is free from the external force in the same way as the second embodiment.

The locking mechanisms of the lens barrel in the camera according to the present invention are solely a safety mechanism of the lens barrel for protection against an external force. Even if the mechanism of the present invention fails, the camera desirably continues to be operative. For this reason, in the second and third embodiments, the mechanisms are locked assisted by the urging of the spring, and the mechanisms are forcibly unlocked in integral motion with the lens barrel.

When the locking plate or locking lever fails to work during an unlocked state, the projection, retraction and zooming of the lens barrel normally operate.

When the locking plate or locking lever fails to work during a locked state, zooming operation remains fully operative though there is a possibility that retraction of the lens barrel into the camera body is disabled.

If a locking operation is designed to be forcibly activated in integral motion with the barrels, zooming will be rendered unusable when the locking plate or locking lever fails to work during an unlocked state.

For this reason, the locking operation is performed assisted by the urging of the spring or the like in the second and third embodiments.

If a camera is of a type of which requirement never permits the lens barrel to be retracted under external force, a locking operation may be made forcibly and an unlocking operation may be assisted by the urging of the spring. Alternatively, both locking and unlocking may be forcibly made.

In any of the first, second and third embodiments, the locking mechanism makes use of the retraction and zooming actions. The present invention is not limited to this arrangement. Instead of a zooming action, focusing action or focal length switching action may be used. In this case, also, a construction similar to those described above will work, resulting in an equal advantage.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. A camera comprising:

a camera body;

a lens barrel linearly moveable between a projected position and a retracted position that is closer to the camera body than the projected position and is rotatable after reaching the imaging position; and barrel position restraint means which allows only linear movement of the lens barrel when the lens barrel linearly moves between the projected position and the retracted position, and which restrains movement of the lens barrel in a direction of the optical axis of the lens barrel when the lens barrel has reached the projected position and rotates a given amount about an optical axis of the lens barrel.

2. The camera according to claim 1, wherein said barrel position restraint means comprises:

a projection extending radially outwardly from an outer circumference of the lens barrel, a restraint member secured to the camera body and cooperating with said projection for restraining movement of the projection in the direction of the optical axis after the lens barrel has reached the imaging position and has rotated a given amount about said optical axis;

a slot portion provided along the lens barrel projection for allowing the projection and hence the lens barrel to move in the direction of the optical axis when the lens barrel has rotated to a position in readiness to be moved to the retracted position, said restraint member restraining movement of the projection and lens barrel in the direction of the optical axis after the lens barrel has reached the projected position and has rotated said given amount.

3. The camera according to claim 1, wherein said lens barrel comprises a first barrel having a projection extending radially outwardly from an outer circumference thereof and is only linearly moveable between the projected position and the retracted position that is closer to the body of the camera than the projected position, and a second barrel which surrounds the first barrel and is moveable along with the first barrel in the direction of the optical axis and which is rotatable about the optical axis relative to the first barrel to drive an imaging lens in the direction of the optical axis, and said camera body has a slot portion that allows the projection to move in the direction of the optical axis and a restraint member that cooperates with said projection to restrain movement of the projection in the direction of the optical axis when the first barrel has reached the imaging position.

4. A camera comprising:

a first barrel having an imaging lens and being moveable between a projected position and a retracted position that is closer to a body of the camera than the projected position, a second barrel which is moveable along with the first barrel in a direction of an optical axis and which rotates relative to the first barrel to drive the imaging lens in the direction of the optical axis relative to the first barrel, and barrel locking means which allows linear movement of the second barrel when the first barrel moves to the projected position or to the retracted position, and which locks the second barrel to the camera body to prevent movement of the second barrel in the direction of the optical axis responsive to rotation of the second barrel by a given angle after the first barrel has reached the imaging position and the second barrel has rotated said given amount about the optical axis.

5. A camera comprising:

a first barrel limited to linear movement and having an imaging lens, a second barrel which surrounds the first barrel and is moveable along with linear movement of the first barrel and which is rotatable relative to the first barrel to drive the imaging lens in a direction of an optical axis relative to the first barrel, first driving means for linearly moving the first barrel between a projected position and a retracted position that is closer to a body of the camera than the projected position, barrel locking means which allows the second barrel to linearly move between the projected position and the retracted position and which locks or unlocks the second barrel to or from the camera body when the first barrel has reached an imaging position by rotating a given amount about the optical axis, and second driving means independent of said first driving means which selectively controls the locking and unlocking of the second barrel by rotating the second barrel by at least said given amount only when the first barrel is in the projected position.

6. The camera according to claim 5, wherein said barrel locking means comprises a locking plate pivotally mounted on said first barrel and a projection extending radially outwardly from a circumference of the second barrel for pivoting the locking plate between an unlocking and a locking position, and a restraint member fixed to the camera body and having a cutout portion for allowing the locking plate to move in the direction of the optical axis when in the unlocking position, and a restraint portion for restraining movement of the locking plate in the direction of the optical axis after the first lens barrel has reached the projected position and the second barrel has been rotated by said second driving means to move the locking plate to the locking position.

7. A camera comprising:

a linearly moveable barrel having an imaging lens and capable of only linear movement along an optical axis, a lens driving barrel surrounding the moveable barrel and being moveable along with the moveable barrel and which is rotatable relative to the moveable barrel to drive the imaging lens in a direction of the optical axis relative to the moveable barrel, first driving means for linearly moving the moveable barrel between an projected position and a retracted position that is closer to a body of the camera than the projected position, second driving means independent of said first driving means for rotating the lens driving barrel after the moveable barrel has reached the projected position, and barrel locking means which selectively allows the lens driving barrel to move and locks the lens driving barrel to the camera body when the moveable barrel has reached the projected position and the lens driving barrel has been rotated through a given angle.

8. The camera according to claim 7, said imaging lens is a focal-point adjusting lens, and said second driving means is focal-point adjusting means.

9. The camera according to claim 7, the imaging lens is a variable-focal-length lens, and said second driving means is focal length changing means.

10. The camera according to claim 7, wherein said barrel locking means comprises:

a locking member provided on the camera body, and flange means, provided on an outer periphery of the driving barrel, having a cutout portion for allowing the locking member to pass through said cutout portion when the moveable barrel moves in the direction of the optical axis, and a groove portion, for receiving the locking member, to block movement of the moveable barrel and the driving barrel in the direction of optical axis when the driving barrel has rotated to a predetermined position.

11. The camera according to claim 7, wherein said barrel locking means comprises:

projection means provided on an outer circumference of the driving barrel, a restraining member provided on said camera; and a locking member provided on the moveable barrel and normally urged to a position where the driving barrel is allowed to move in the direction of the optical axis and moved by the projection means upon rotation of the driving barrel, blocking movement of the driving barrel in the direction of the optical axis.

12. The camera according to claim 7, wherein said barrel locking means comprises:

a locking lever having a locking portion that engages with the movable barrel and projection means slidably engaging an outer periphery of the driving barrel, said locking lever pivoting relative to the camera body between a locked position where the locking lever locks on the movable barrel and an unlocked position where the locking engagement is unlocked, and cam means, provided on an outer surface of the driving barrel, for unlocking the locking engagement between the movable barrel and the locking lever and enabling the movable barrel to move when the driving barrel rotates to a first position, and for blocking movement of the movable barrel by locking the movable barrel with the locking lever when the driving barrel rotates to a second position.

13. A camera of a type having an imaging optical system retractable into a body of the camera comprising:

a barrel housing the imaging optical system, being only linearly moveable along the optical axis between a retracted state and a ready-for-use state and being rotatable when in the ready-for-use state, said barrel being at least partly retracted into the camera body in its retracted state, and projected more forwardly out of the camera body in its ready-for-use state than in the retracted state, and locking means for locking the barrel to the camera body to prevent movement of the barrel in both directions along an optical axis when the barrel is moved to the ready-for-use state and has rotated about the optical axis to a given position from said ready-for-use-state, and for allowing the barrel to move linearly relative to the camera body in the direction of the optical axis of the imaging optical system in a non-photographing stale when the barrel has been rotated about the optical axis back to the ready-for-use-state.

14. A camera of a type having an imaging optical system retractable into a body of the camera comprising:

a barrel containing the imaging optical system, at least partly retracted into the camera body in a retracted state, and projected more forwardly out of the camera body in its ready-for-use state than in the retracted state, linear driving means for linearly driving the barrel between an imaging position and a retracted position and rotational driving means for rotating the barrel about the optical axis between said ready-for-use state and an imaging state, and movement restraint means, wherein when the linear driving means drives the imaging optical system barrel to the ready-for-use state and the rotational driving means drives the barrel through a given angle about an optical axis of said imaging optical system, said movement restraint means blocks movement of the barrel in the direction of the optical axis of the imaging optical system.

15. A camera of a type having an imaging optical system retractable into a body of the camera comprising:

a moveable barrel linearly moveable between a position for retracting the imaging optical system into the camera body and a position for projecting the imaging optical system from the camera, a rotatable driving barrel which linearly drives the imaging optical system to move the imaging optical system in a direction of an optical axis, linearly moveable barrel driving means for driving the moveable barrel only in a direction of the optical axis of the imaging optical system to drive the imaging optical system into and out of the camera body, driving barrel driving means independent of said linearly moveable barrel driving means for rotating the driving barrel, when the moveable barrel has been moved to a given position along the optical axis, to drive the imaging optical system in the direction of the optical axis of the imaging optical system relative to the linearly moveable barrel, and movement restraint means for allowing the moveable barrel driving means to linearly move the imaging optical system to a predetermined position, and for blocking the movement of the imaging optical system in the direction of the optical axis when the linearly moveable barrel is moved to a ready-for-use state and the driving barrel driving means has rotated the driving barrel to a given position.

16. The camera according to claim 15, wherein the movement restraint means comprises a pair of cooperating locking means, with one of the pair of cooperating locking means provided on the camera body while another one of the pair of cooperating locking means is provided on the moveable barrel, wherein locking is performed only when the imaging optical system is in a ready-for-use state and the driving barrel has been rotated a given amount about the optical axis.

17. The camera according to claim 15, wherein the driving barrel is comprised of a cylindrical member surrounding said moveable barrel, which cylindrical member moves the imaging optical system in the direction of the optical axis to change a focal length of the imaging optical system.

18. The camera according to claim 15, wherein the driving barrel comprises a cylindrical member which moves at least one element of the imaging optical system to focus the imaging optical system.

19. The camera according to claim 15, wherein the driving barrel comprises a cylindrical member which moves at least two elements of the imaging optical system to zoom the imaging optical system.

20. A camera according to claim 1 wherein said lens barrel comprises a first barrel moveable along the optical axis and a second barrel moveable with said first barrel and being rotatable about the optical axis relative to said first barrel;

first and second arcuate, axially spaced projections extending radially outwardly from said second barrel;

a slot provided in said first projection;

said restraint means including a restraint member moveable through said slot when said first barrel moves toward said imaging position and engaging said second projection when said second barrel is rotated after reaching the imaging position.

21. A camera according to claim 1, wherein said lens barrel includes a first barrel moveable along the optical axis and a second barrel linearly moveable with said first barrel and being rotatable about said optical axis;

a pair of arcuate, axially spaced projections extending radially outwardly from said second barrel and spaced apart to provide a gap therebetween;

a slot provided in one of said projections;

said restraint means comprising a member moveable through said slot when said first barrel is moved towards the imaging position and being positioned in said gap so as to be locked between said first and second projections when said second barrel is rotated to an imaging position.

22. A camera according to claim 1, further comprising said lens barrel comprising a first barrel member linearly moveable in an optical axis direction between a retracted position and an imaging position;

a second barrel member moveable with said first barrel and surrounding said first barrel and being rotatable about said optical axis;

a member pivotally mounted on said camera body and having a projection and a slot;

said first and second barrels having projections extending radially outwardly;

said projection on said pivotally mounted member moving said slot of said pivotally mounted member away from a projection on said first barrel when said first barrel is moved to the imaging position;

said projection on said pivotally mounted member being moved off of said projection on said second barrel when said second barrel is rotated after the first barrel is moved to the projected position whereupon said slot of said pivotally mounted member embraces said projection on said first barrel to restrain said first barrel from moving in the optical axis direction.

23. A camera according to claims 22, wherein said slot prevents movement of the first barrel in either direction along the optical axis when said slot embraces said projection on said first barrel.

24. A camera comprising:

a first lens barrel moveable only in a linear direction along an optical axis of said camera and containing at least one lens element having a cam follower;

a second lens barrel surrounding said first lens barrel and being rotatable about said first lens barrel and said optical axis and having a cam cooperating with said cam follower for moving said lens element;

a restraining member provided on said camera;

a projection provided on said second lens barrel;

a first driving means for moving said first lens barrel between a retracted position and a ready-for-use position;

a second driving means for rotatably driving said second barrel, whereby when said first driving means drives said first barrel to said ready-for-use position, said second barrel being moveable therewith to said ready-for-use position, and said second driving means rotates said second barrel through a given amount about said optical axis to move said lens element relative to said first barrel, said projection on said second barrel is engaged by said restraining member to prevent movement of said first and second barrels in a direction of the optical axis.

* * * * *

UNITED STATES PATENT AND TRADEMARK OFFICE
CERTIFICATE OF CORRECTION

PATENT NO.     : 6,160,583
DATED          : December 12, 2000
INVENTOR(S)    : Kato et al.

It is certified that error appears in the above-identified patent and that said Letters Patent is hereby corrected as shown below:

<u>Title page,</u>
After Inventors:, and before Appl. No.:, insert therefor -- [73] Assignee: Olympus Optical Co., Ltd. --.

Signed and Sealed this

Twenty-fifth Day of November, 2003

JAMES E. ROGAN
*Director of the United States Patent and Trademark Office*